UNITED STATES PATENT OFFICE.

GUILLERMO VÖLCKERS, OF SAN JUAN, PORTO RICO.

METHOD OF MAKING COFFEE-EXTRACT TABLETS.

1,058,278.   Specification of Letters Patent.   Patented Apr. 8, 1913.

No Drawing.   Application filed February 23, 1912.   Serial No. 679,414.

*To all whom it may concern:*

Be it known that I, GUILLERMO VÖLCKERS, a citizen of Porto Rico, and resident of San Juan, Porto Rico, have invented certain new and useful Improvements in Methods of Making Coffee-Extract Tablets, of which the following is a full and clear specification.

I obtain a liquid extract of coffee by subjecting roasted ground coffee to the action of boiling water a sufficient length of time to extract the maximum amount of coffee essence without destroying its flavor. This extract is filtered and evaporation is continued until the extract reaches a certain degree of density and strength. This strong extract is then, while still hot, throughly mixed with a hot syrup which has been previously prepared by boiling pure granulated sugar and water to a suitable consistency. The application of heat to this product is continued until it comes to a sufficiently pasty condition to permit it to be molded. It is then molded into the form of tablets or cakes and allowed to cool. The tablet or cake thus produced is dry and hard but upon being immersed in hot water will readily disintegrate and set free the extract and dissolve the sugar and thus convert the water into beverage coffee, sweetened, ready for immediate consumption.

A feature of great importance is that the extract becomes practically dry in the pastil and is sealed in and protected by the mass of decrystallized sugar, whereby the extract will keep in prime condition in any climate and for a long period of time, and I accomplish this without the employment of any chemicals whatever.

I have ascertained by repeated experiments that by my process I can produce tablets which will contain about 40% coffee extract so that a comparatively small cake or tablet will be ordinarily sufficient to make one cup of coffee of average strength. I have found also that the coffee beverage produced from my tablets possesses the same strength and flavor and aroma as when made directly from the roasted bean in the usual manner.

Having thus described my invention, what I claim as new and desire to secure by Letters Patent, is—

The process of making a coffee tablet disintegratable in hot water, consisting in first making a dense filtered liquid extract of coffee, then thoroughly mixing it while hot with a hot mass of sugar syrup previously prepared by boiling sugar in water, then evaporating sufficient moisture from the mixture to permit molding, then molding the mass into tablet form and then cooling and drying the molded forms.

In testimony whereof I hereunto affix my signature in the presence of two witnesses.

GUILLERMO VÖLCKERS.

Witnesses:
 MANUEL V. DEL VALLE,
 S. SANCHERCYRALES.